June 27, 1961 T. K. JAMISON 2,990,143
ROCKET LAUNCHING RAMP AND MECHANISM
Filed June 16, 1958 4 Sheets-Sheet 2
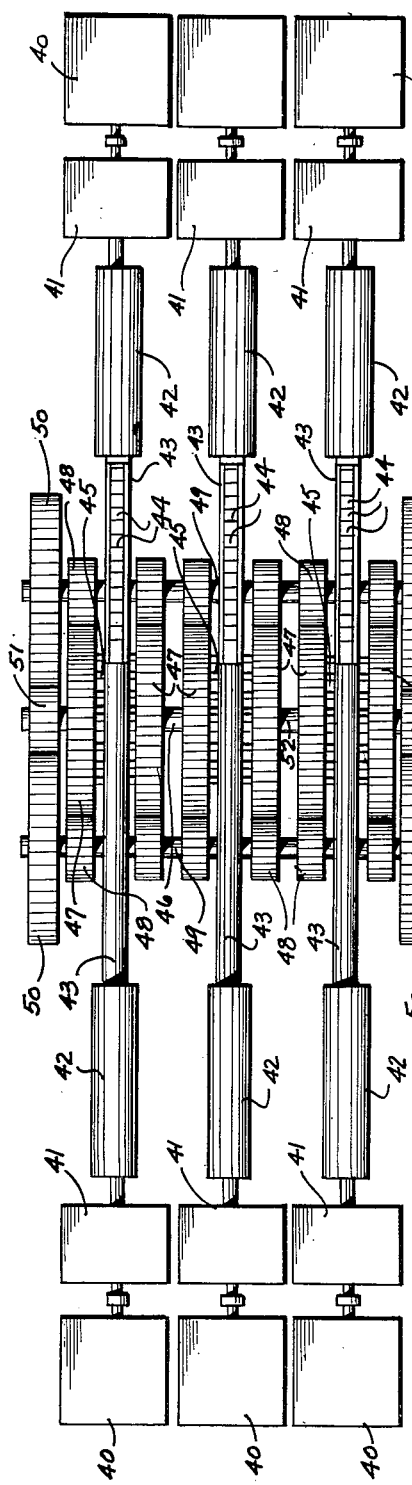
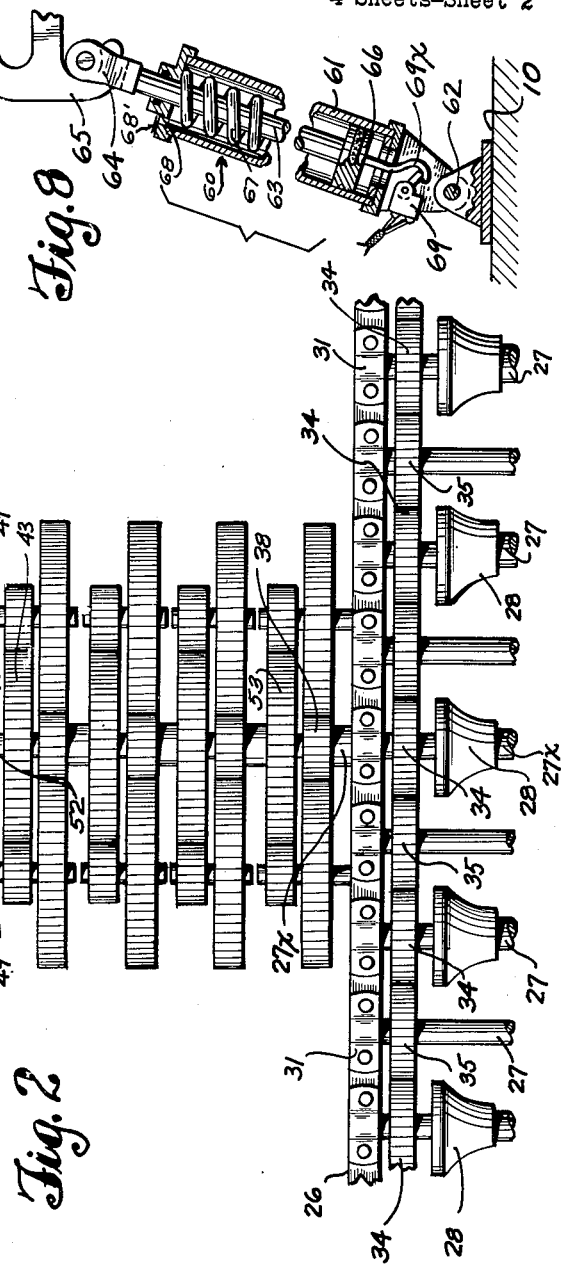
INVENTOR.
TRUMAN K. JAMISON
BY
Robinson + Berry
ATTORNEYS June 27, 1961
T. K. JAMISON
2,990,143
ROCKET LAUNCHING RAMP AND MECHANISM
Filed June 16, 1958
4 Sheets-Sheet 3
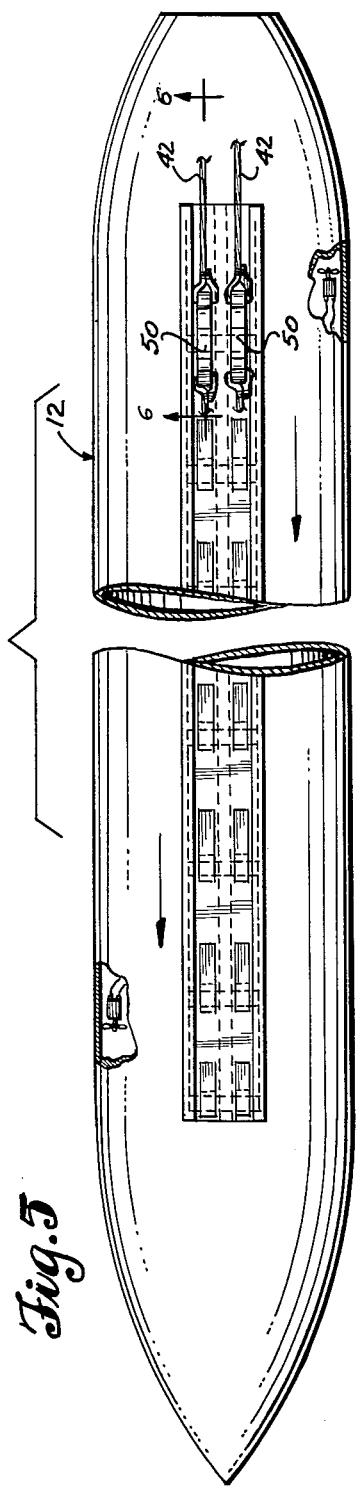
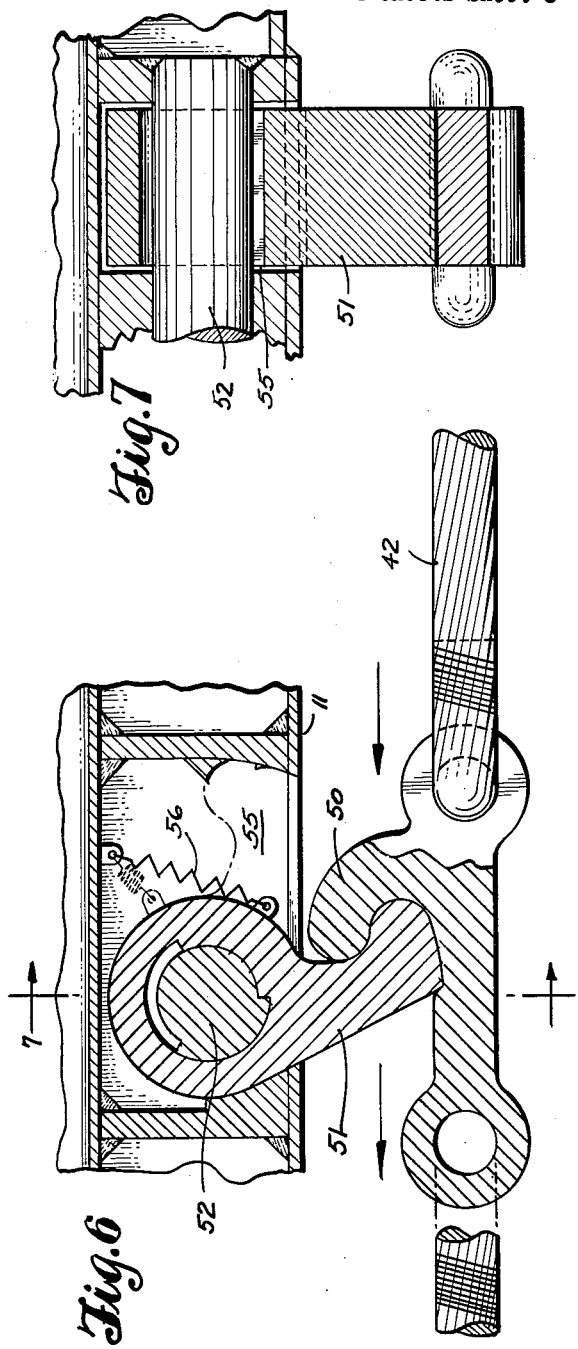
INVENTOR.
TRUMAN K. JAMISON
BY
Robinson & Berry
ATTORNEYS June 27, 1961   T. K. JAMISON   2,990,143
ROCKET LAUNCHING RAMP AND MECHANISM
Filed June 16, 1958   4 Sheets-Sheet 4
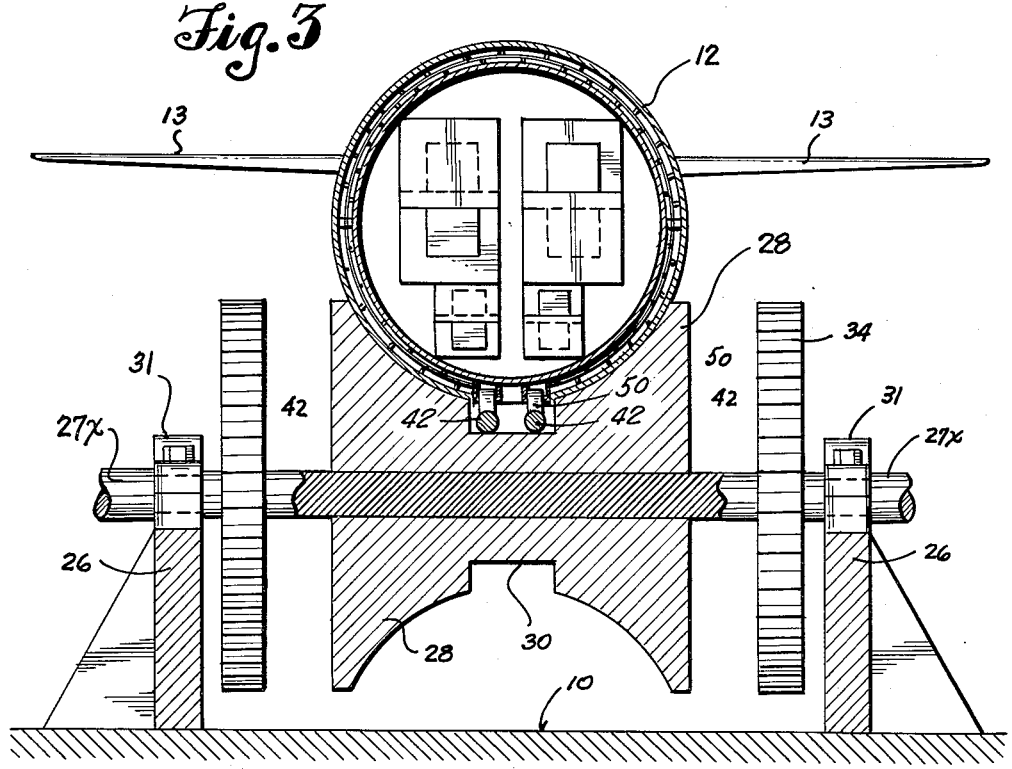
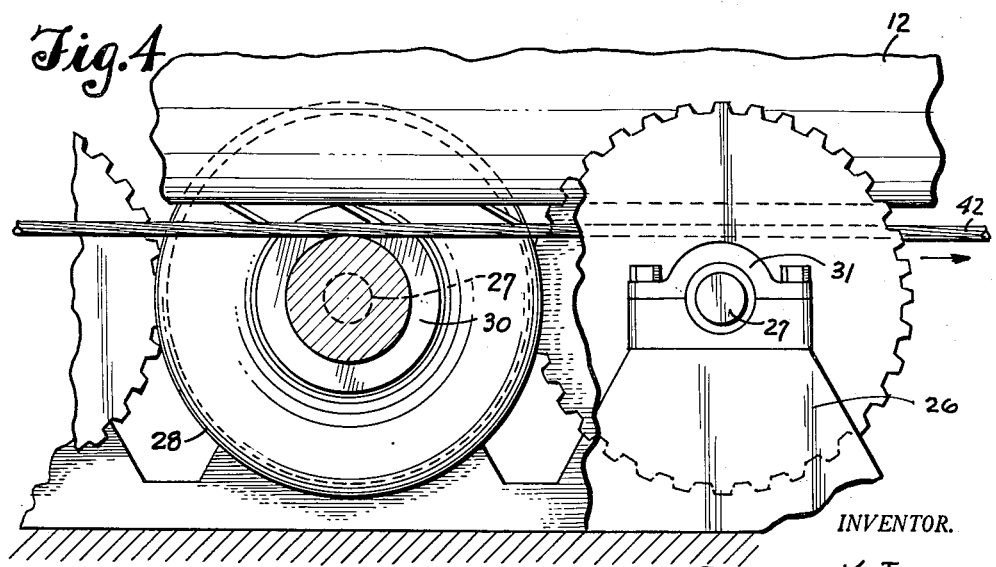
INVENTOR.
BY TRUMAN K. JAMISON
ATTORNEYS

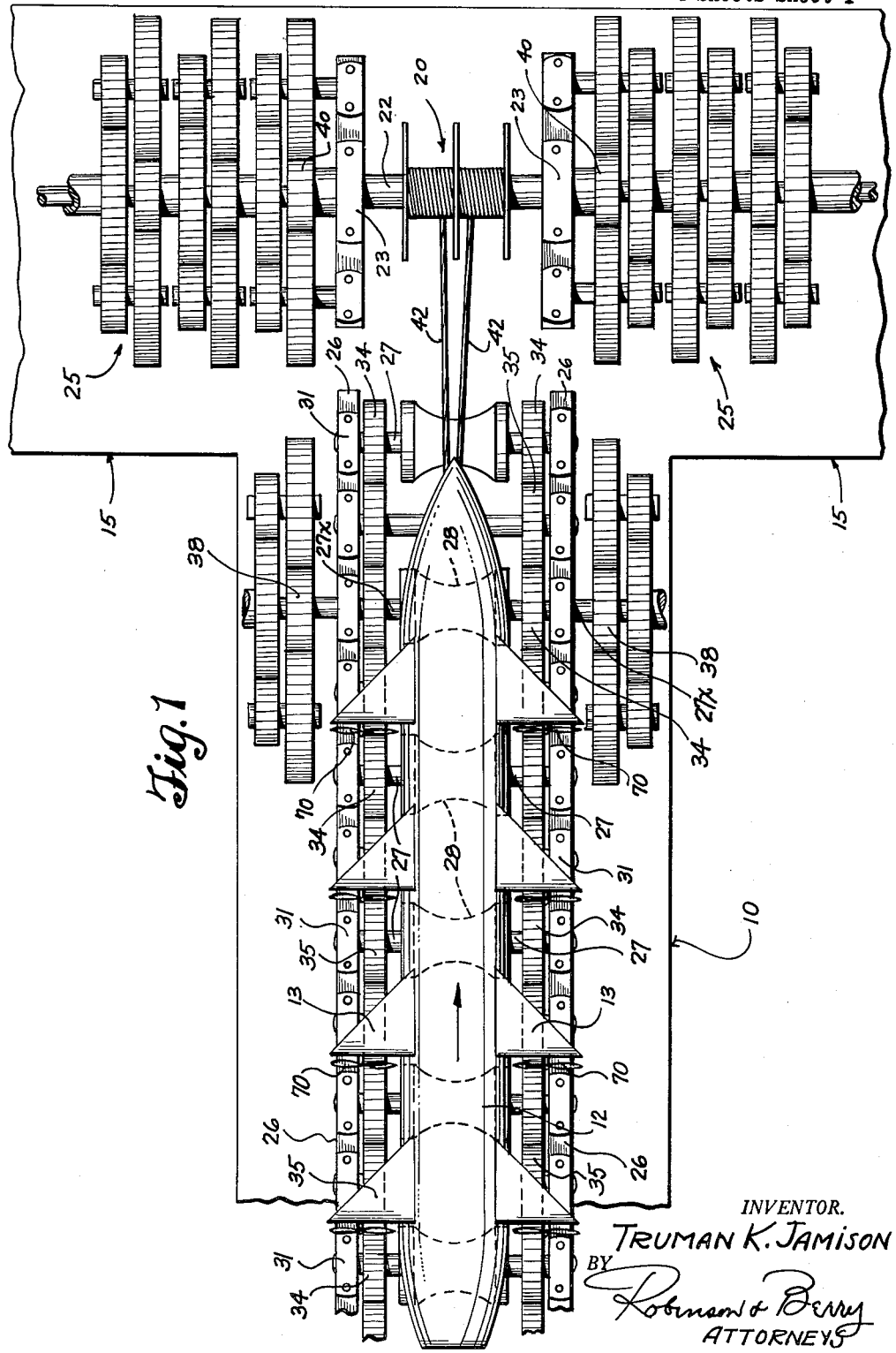

United States Patent Office 2,990,143
Patented June 27, 1961

2,990,143
ROCKET LAUNCHING RAMP AND MECHANISM
Truman K. Jamison, 86 Virginia St., Seattle, Wash.
Filed June 16, 1958, Ser. No. 742,237
1 Claim. (Cl. 244—63)

This invention relates to rocket or missile launching mechanisms. More particularly it relates to a ramp and powered means thereon whereby a jet propelled or otherwise powered space rocket can be launched for travel in outer space.

It is the principal object of this invention to provide a novel form of ramp for the launching of a rocket, and novel means associated with the ramp for catapulting the rocket along the ramp at such speed that its initial take-off into outer space for continued flight will be insured.

It is also an object of this invention to provide a ramp that is equipped at its discharge end with a cable winding drum on which a rocket catapulting cable or cables are wound, and wherein at intervals therealong, guiding and supporting rollers of novel form for the rocket are mounted; these rollers being connected with a powerful driving means or engines for driving them to cooperate with the cable winding means as an aid in the rocket launching operation.

Yet another object of this invention resides in the use of the cable winding drums, the cables and the engines for effecting the high speed travel of the rocket along the ramp for launching it into space, and in the provision of self-releasing hooks for connecting the cables to the rocket.

Still further objects and advantages of the present invention reside in the detail of construction of parts embodied in the rocket, in the ramp and in the power supplying means employed for the launching operation; in the mode of applying the launching power and in the operation of the combined devices as will hereinafter be fully described.

In accomplishing the above mentioned and other objects of the invention, I have provided the improved details of construction, the preferred forms of which are illustrated in the accompanying drawings, wherein:

FIG. 1 is a plan view of the discharge end portion of the present rocket launching platform, and a portion of the launching mechanism, and showing the rocket as mounted for travel on the ramp and as connected to the launching cables of the cable winding drum.

FIG. 2 is a plan or top view of one of the power units employed in connection with the ramp for rotatably driving the rollers on which the rocket is supported for travel on the ramp.

FIG. 3 is an enlarged cross-section, through the ramp showing the form of the rollers which support and guide the rocket in its travel on the ramp.

FIG. 4 is a fragmental side view of a part of the ramp, showing one of the rocket mounting rollers and its driving gearing, and illustrating the manner in which the rocket and its launching cables are supported and guided by the rollers.

FIG. 5 is an underside view of the rocket, showing the means for attaching the launching cables thereto.

FIG. 6 is a sectional detail taken on line 6—6 in FIG. 5.

FIG. 7 is a cross-section taken on line 7—7 in FIG. 6.

FIG. 8 is a detail of a cable releasing device.

Referring more in detail to the drawings.

Briefly described, the present invention resides in the provision of an elongated and upwardly inclined ramp or trackway supporting powered means thereon whereby a rocket or space missile may be catapulted into outer space; it being understood that the launched rocket or missile would be equipped with self-propelling means of present day form that would be caused to take effect upon launching of the missile and that the present ramp mounted mechanism is only to catapult or initially start the rocket in its travel into outer space.

It will here be noted that the ramp of the present invention would be of substantial length, varying with the size and weight of the rocket and its required launching speed. It is now believed that such a ramp, suitable for launching the present missile, would be from one to five thousand feet long and would be upwardly inclined at an angle of approximately 30 degrees. It is designed as a sort of trackway on which the rocket or missile to be launched, which is of cigar shape, would be mounted for endwise travel under the propelling force of the rotatably driven rollers on which it is guided, but primarily by the pull of its launching cables as wound onto the cable winding drums. It is anticipated that the rollers and cable winding drums will be driven in synchronism by a power producing means which form the subject matter of claims in my now abandoned application filed under Serial No. 671,638 on August 16, 1957 and which is not shown in detail in the present drawings but only in part.

Referring first to FIG. 1, the ramp proper is therein indicated in its entirety by reference numeral 10. It is to be understood that, in this view, only the discharge end portion of the ramp has been shown, and that the unshown portion which would lead up to that part here shown might be of considerable length. A rocket or missile designed for travel on the ramp for launching, is here designated in its entirety by reference numeral 12. It is here shown as being of cigar shape, with pointed forward end. It is circular in cross-section as shown in FIG. 3 and is equipped with a plurality of paired sets of laterally directed wings 13—13 located above its axial level to stabilize its flight.

At the discharge end of the ramp 10, is an engine platform 15, directed transversely of and to opposite sides of the line of the ramp. It is on this platform that the power devices or engine for driving the cable winding drum are mounted. As shown in FIG. 1, the cable winding drum or drums is designated in its entirety by numeral 20 and it is shown to be mounted on a supporting and driving shaft 22. This shaft is rotatably mounted in bearings 23—23 at opposite ends of the drum and has driving connections at its opposite ends with the power transmitting units which are shown only in part in FIG. 1 and are designated generally by reference characters 25—25. Each of these units is like that shown in FIG. 2 which will be described in connection with the driving of the rocket guiding rollers of the ramp.

The ramp, as will be best understood by reference to its showing FIGS. 1, 3 and 4, comprises a base on which laterally spaced, parallel rails 26—26 are fixed. Supported between these rails, at intervals which are about one-fifth the length of the rocket, are horizontal cross-shafts 27 on alternate ones of which rollers 28 are fixed. All rollers 28 are axially parallel and of the same size and they are arranged to coact for support and guided travel of the rocket as it is advanced upwardly along the ramp. In longitudinal section the rollers 28 are as shown in FIG. 3. It is therein observed that their surfaces are curved to fit the cylindrical form of the rocket as it travels thereacross. Also, as well shown in FIG. 3, each roller is reduced in diameter midway of its end to provide an encircling channel 30 for passage and support of the cables as presently explained.

The cross-shafts 27 that mount the rollers 28 are rotatably mounted in bearings 31 fixed on the rails 26 and each of these is equipped at opposite ends at the inside of the bearings with driving gear wheels 34. These gears, in succession, as arranged along the ramp are connected through the mediacy of idler gears 35 that revolve on their supporting shafts 27 thus to cause all roller mounting shafts to rotatably drive their rollers 28 in unison and in the same direction to deliver propelling force to the rocket as it moves thereacross along the ramp.

At regular intervals along the ramp, cross-shafts 27, such as that designated at 27x in FIG. 1 are extended beyond the opposite rails 26 and are equipped with driving gear wheels 38 through which they are connected with engines, not herein shown in detail but comprised by that mechanism that is located above the rail 26 in FIG. 2. Each engine, preferably comprises a major part of the subject matter of my previously mentioned co-pending application.

Briefly described, in reference to the showing in FIG. 2, the engine shown comprises a plurality of electric motors, represented by the rectangles 40, that are located in paired relationship at opposite sides of the extended axial line of the roller drive shaft 27x in which the engine is connected through gear wheel 38. Each motor drives a pump 41, and each pump operates to deliver a hydraulic pressure medium into a corresponding cylinder 42 to effect the reciprocal action of a piston rod 43. It will be understood by reference to FIG. 2 that the piston rods are common to paired cylinders. These rods are equipped with pawls 44 which operate as the rods move in one direction, to drive ratchet wheels 45 which are supported for rotation on a line shaft 46.

Fixed to the three ratchet wheels here shown for driving thereby are the six large gear wheels 47, each of which is in mesh with the two smaller gears 48 fixed on parallel shafts 49—49 which at their ends mount large gear wheels 50. Paired wheels 50 mesh with smaller gears 51 to drive a shaft 52. Shaft 52 is equipped with a large gear 53 which operates through dual speed increasing gear trains to drive the gear 38 which is mounted on and drives the shaft 27x and the roller 28 carried thereon.

An engine, as shown in FIG. 2, is operatively connected with each of the opposite ends of the roller driving cross shafts 27x. All other roller mounting cross shafts are driven through the gear trains that are made up of the gears 34 and 35 that are shown adjacent the insides of the rails 26—26.

The present engine, as shown in FIG. 2 is disclosed as being one means that may be used for driving the shaft 27x, but it is to be understood that any other satisfactory engine, or motor which can produce the necessary power to drive the succession of rollers directly associated with the cross shafts 27x and 27, can be employed.

The shaft 22 on which the cable winding drums 20 are mounted, is equipped at its outer ends with driving gears 40 and these are adapted to be driven through gear trains and powered by engines, 25, which may be like those for driving the rollers seen in FIG. 2, or by other suitable power means that will operate to drive the drums at the speed required for the rocket launching operation. The drum here shown is equipped to wind two cables 42—42. Preferably these cables are of nylon.

Assuming that the rocket 12 is mounted on rollers 28 at the end of the ramp that is remote from the drum 20 and that the two cables have been extended from the drum along the ramp, across the succession of rollers 28 within the channels 30 therein, and are connected at their ends to the under side of the rocket, as shown in FIG. 3, it will be understood that the driving of the drum to cause winding of the cables thereon will advance the rocket accordingly. As the cables build upon the drums, the rocket speed is accelerated. This propelling speed, as produced by the driving of the cable winding drums, is augmented by the driving of the rollers 28. As the rocket advances along the ramp, its rate of travel accelerates and it is the function of the engines to accelerate it to such extent that, at the end of the run, the rocket will have reached the desired launching speed.

It has been shown in FIG. 6 that these launching cables are equipped along their end portions with a succession of hooks 50 and that each is holdingly engaged with an oppositely related anchor hook 51 that is pivoted in the bottom of the rocket on a cross shaft 52.

When the rocket passes from the discharge end of the ramp across the cable drum, the hooks 50 and 51 are automatically disengaged and the hooks 51 are spring actuated into pockets 55 in the shell of the rocket. Such a spring for this purpose is shown at 56 in FIG. 6. In order to effect a positive release of the hook at the end of the cable, a releasing device designated in its entirety by numeral 60 is fixed on the ramp; this being as shown in FIG. 8 wherein it is shown to comprise an air cylinder 61 that is pivoted on the ramp, as at 62. A piston rod 63 extends from the upper end of the cylinder to a position at which a yoke or loop 64 at its outer end will be caused to be contacted by the downwardly directed leg of a T shaped head 65 of the hook at the end of the launching cable.

On the inner end of the piston rod is a piston 66 fitted to the cylinder. Applied about the piston rod, in the upper end of the cylinder is an impact cushioning spring 17.

The upper cylinder head is formed with a plurality of air discharge ports 68 and these are each equipped with spring loaded valves 68' that will open under the force of air trapped in the cylinder, thus to aid the spring in cushioning the impact.

Normally the piston is disposed at the lower end of the cylinder as in FIG. 8. However, when the yoke 64 is engaged by the cable hook 65, it will be moved outwardly. Mounted on the lower cylinder head is an electric switch 69 which is arranged to close by a connection 69x incident to outward movement of the piston. Closing of the switch effects the energization of means whereby the drum and roller propelling force of the engines will be discontinued and the reverse drive started thus to bring the cable drum to a quick stop.

It has been shown in FIG. 5 that the rocket or missile 12 is equipped along the under side with a succession of the anchor hooks 51 engaged to the cable hooks 50 so that the pull of the launching cables will be distributed substantially to the full length of the rocket. It is to be seen, also, in FIG. 1, that the rocket is equipped at opposite ends, back of the wings 13, with propellers 70 that are designed to be set in motion after the missile has been launched, to aid in its flight into outer space. The propellers are to be driven by means within the missile and not forming a part of this invention.

What I claim as new is:

In combination, a powered space missile and a launching ramp therefor; said missile being of elongated, cigar shape and equipped at intervals along its underside with a succession of cable attaching hooks; said ramp comprising an elongated and upwardly directed runway, equipped at intervals throughout its length with transversely mounted rollers, engine, engine driven cable winding drums at the discharge end of the ramp and cables extended from said drums along the ramp and across the rollers and equipped at their ends with hooks for holdingly engaging with cable attaching hooks of the missile; said rollers being troughed between their ends to seat the missile and each having an encircling channel for reception and guiding support of the launching cables as drawn thereacross along the ramp, and means at the discharge end of the ramp for contacting the cable hooks to disengage them from the missile hooks as they leave the discharge end of the ramp.

References Cited in the file of this patent

UNITED STATES PATENTS

| | | |
|---|---|---|
| 1,284,360 | Kellogg | Nov. 12, 1918 |
| 1,527,125 | Woolfson | Feb. 17, 1925 |
| 1,663,058 | Peppin | Mar. 20, 1928 |
| 1,997,945 | Olaszy | Apr. 16, 1935 |
| 2,369,455 | Grause | Feb. 13, 1945 |
| 2,375,449 | Unger et al. | May 8, 1945 |
| 2,611,355 | Ashwood | Sept. 23, 1952 |
| 2,756,950 | Greenough | July 31, 1956 |